E. B. KEITH.
PRESSURE REGULATOR FOR TIRES.
APPLICATION FILED APR. 7, 1916.
1,243,420. Patented Oct. 16, 1917.
2 SHEETS—SHEET 1.
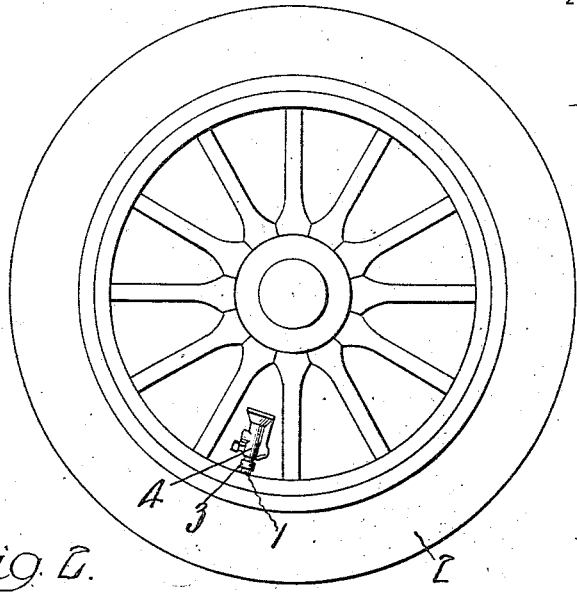
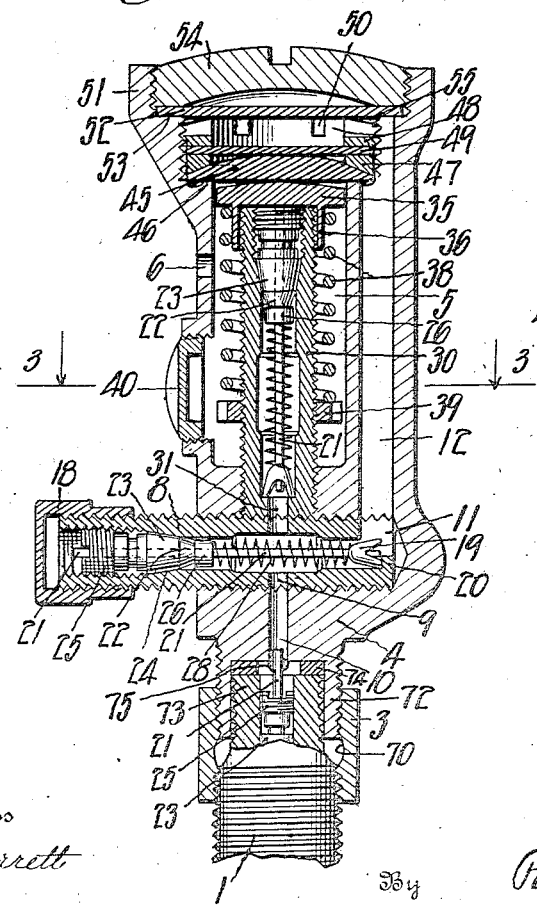
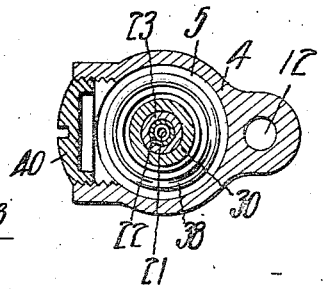
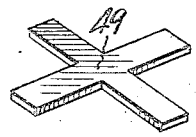
Inventor
Edward B. Keith,
By Pagelsen & Spencer
Attorneys
Witness
E. R. Barrett Inventor
Edward B. Keith,
By Pagelsen & Spencer
Attorneys

UNITED STATES PATENT OFFICE.

EDWARD B. KEITH, OF PONTIAC, MICHIGAN.

PRESSURE-REGULATOR FOR TIRES.

1,243,420.

Specification of Letters Patent.

Patented Oct. 16, 1917.

Application filed April 7, 1916. Serial No. 89,571.

*To all whom it may concern:*

Be it known that I, EDWARD B. KEITH, a citizen of the United States, and residing at Pontiac, in the county of Oakland and State of Michigan, have invented a new and Improved Pressure-Regulator for Tires, of which the following is a specification.

This invention has reference to a pressure controller for pneumatic tires, and its object is to provide a device of this nature which is simple and compact and in which a more accurate regulation of the pressures is secured than has heretofore been possible.

To these ends the invention consists in a tire controller comprising an air escape passage of small cross section, a valve for closing the same, a valve stem for the valve, and a flexible diaphragm whereby a pressure chamber is sealed and the pressure therein is caused to force the valve in one direction, together with a spring co-axial with the valve stem and acting in opposition to the diaphragm for preventing the latter from moving the valve; also in the above mentioned elements in combination with a cap interposed between the stem and the diaphragm whereby the pressures of the spring and the diaphragm are received and neutralized; also in means for regulating the tension of the spring; in a valve of the character above described through which air may be pumped into the tire; in special means for securing the diaphragm in sealed relation to a casing by which the valves are carried. It also consists, in combination with the features above named, in a reservoir for compressed air located on the wheel, together with proper valve mechanism for admitting air to the tire whenever the pressure therein falls below a predetermined amount; also in the details of construction shown, described and claimed.

Figure 5:
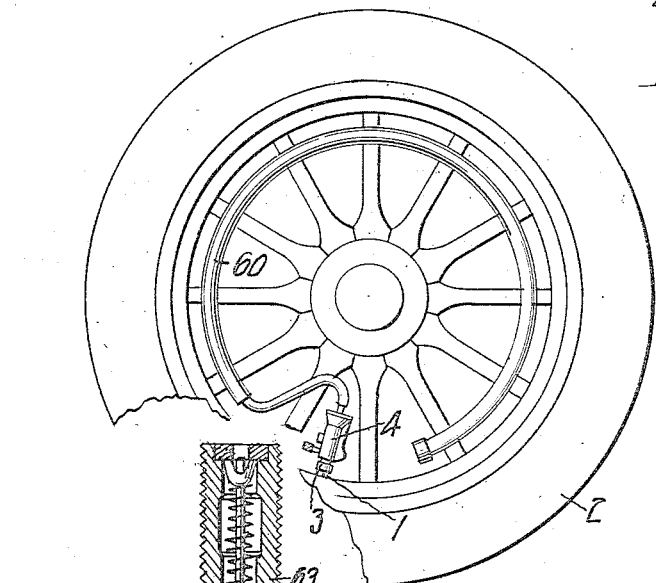
Figure 6:
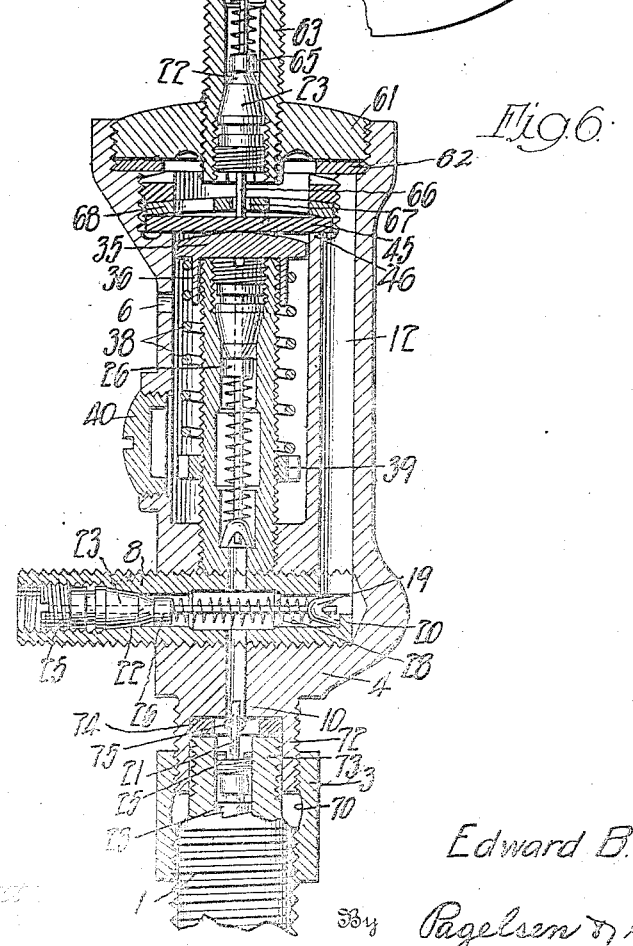

In the drawings, Figure 1 is a side view of a wheel equipped with a preferred embodiment of the invention. Fig. 2 is a longitudinal section through the device mounted on the usual tire stem. Fig. 3 is a section on the line 3—3 of Fig. 2. Fig. 4 is a perspective view of a follower for the diaphragm. Fig. 5 is a view corresponding to Fig. 1, showing a modification. Fig. 6 is a central longitudinal section corresponding thereto.

Like reference characters indicate corresponding parts throughout the several views.

The stem 1 of the usual tire 2 has mounted thereon, preferably by means of the coupling 3, a casing 4 having a central chamber 5 with an enlarged outer end. The chamber is in free communication with the atmosphere through a passage 6. Below the chamber the casing is threaded transversely to receive a valve tube 8, which is pierced at 9 to register with a longitudinal passage 10 formed in the casing and which has its open inner end 11 in communication with a longitudinal passage 12 in the casing alongside of the chamber 5. The valve tube 8 contains an inwardly opening valve of well known form and normally has its outer end sealed by a cap 18 threaded thereon. As shown, the valve mechanism comprises a perforated guide 19 that engages the end wall 20 of the tube 8, a valve stem 21 slidable through the guide, a conical valve seat 22 (including a circumferential washer 23 of fiber or the like) conforming to a conical bearing 24 on the inner surface of the tube, said seat being held in place by a threaded plug 25 received in the internally threaded outer end of the valve tube. A valve 26, rigid with the rod and having its seat engaging surface of soft material, is normally held in engagement with the seat 22 by a spring 28 that surrounds the valve stem and rests against the guide 19. It will be understood that the valve stem fits loosely in a bore in the seat 22 and has its outer end extending somewhat beyond the latter; consequently when the cap 18 is removed, the valve stem may be pushed inwardly to force the valve from the seat, or a hose from a suitable air pump may be secured thereon in lieu of the cap and the tire pumped up in the usual manner. The passage 12 therefore contains air under the same pressure as that in the tire.

Extending longitudinally centrally of the chamber 5 is a second valve tube 30 containing valve mechanism of the same character as heretofore described, and the inner end of this tube is brought into communication with the interior of the tube 8 by means of a passage 31 through the wall of the latter— thus the tube 30 also contains air of the same pressure as that in the tire. A cap or piston member 35 having a depending guide flange 36 fits over the outer end of the tube and is thrust outwardly thereon by a spiral spring 38, the inner end of which rests on a nut 39 threaded on the tube. By removing a plug 40 in the side of the chamber 5, access may be had to the nut for adjusting the tension of the spring.

The member 35 is thrust in an opposite or inward direction by a diaphragm 45, preferably of rubber, which is stretched in the manner of a drum head and is held in sealed engagement with an annular seat or shoulder having an outwardly extending inner margin 46 by a ring 47, the outer portion of which is thicker than the inner; and the ring is in turn held in place by an annular nut 48, a thin metal spider 49 (Fig. 4) being interposed between the nut and ring to reinforce the diaphragm against the thrust of the spring. Radial grooves or slots 50 cut in the outer surface of the nut are adapted to receive a suitable wrench. The internally threaded outer end 51 of the casing is closed by a sealing disk 52 of rubber or other suitable material that is held tightly against an annular shoulder 53 by means of a threaded cap 54; and for the purpose of saving space, the disk may be made to bear on the outer surface of the nut and the latter may be beveled to form a circumferential channel 55 through which air from the passage 12 may pass around the nut and through the grooves 50 into the pressure chamber between the disk and the diaphragm. It will be observed that the cap 35 fits rather closely to the wall of the chamber 5 and that its outer surface is spherical.

In operation, as stated above, air is pumped into the tire through the tube 8 and fills the tube 30 together with the passage 12 and the chamber between the disk 52 and the diaphragm 45. Should the pressure exceed a predetermined maximum either in pumping up the tire or due to expansion of the air by heat, the flexible diaphragm, pressing in on the cap 35, overcomes the tension of the spring 38, whereupon the cap contacts with the outer end of the valve stem and pushes the latter inwardly to unseat the valve, thus allowing the air to gradually escape until the pressure is reduced to the desired maximum. In this action the diaphragm transfers pressure to the cap and affords a practical sealing means for the air chamber while the small clearance between the cap and the wall of the chamber, together with the stretching effect above alluded to of the nut 47 on the diaphragm 45, prevents wedging of the latter between these parts and the inaccuracy in the relation of the movement of the cap and the pressure which would result therefrom. Thus a device is secured which is accurate and reliable, whereas a metallic valve of the general character of the cap if in direct contact with the compressed air would be incapable of properly controlling the pressure and would be a much more expensive construction.

For the purpose of renewing the pressure in the tire as well as preventing it from exceeding a predetermined amount, the modification shown in Figs. 5 and 6 has been devised. In this instance, the wheel is provided with a suitable container 60 for compressed air, and the cap 54 and disk 52 are replaced by a cap 61 and washer 62. The latter has passing therethrough a valve tube 63 (preferably soldered therein) in which valve mechanism of the same nature as that previously described is inclosed. The valve 65 opens outwardly, that is, away from the diaphragm chamber and the inner end 66 of its stem extends through a hole 67 in a spider 68 (that replaces the spider 49) to engage with the diaphragm 45. Therefore, in addition to the pressure relieving functions of the first described device, air is admitted from the container 60 to the tire whenever the pressure falls low enough to allow the spring to deflect the diaphragm. The pressure is accumulated in the container by flow of air from the pump through the tube 8, passage 12, the diaphragm chamber and the tube 63.

The coupling 3 is in each instance of the right-and-left variety, the threads being removed centrally thereof, as indicated at 70, and the casing 4 is provided with the hollow externally threaded portion 72 with which one thread of the coupling engages. This hollow portion is not threaded interiorly and receives the usual reduced externally threaded upper end 73 of the stem 1, a gasket 74 being interposed to insure a tight joint. The usual valve seat 23, securing nut 25 and valve stem 21 (the same in detail as the correspondingly designated parts heretofore described) are inclosed in the stem. The proportions of the casing are, however, preferably such that, when the coupling is fully screwed into place, the wings or lugs 75 which are ordinarily formed near the upper end of the stem, contact with the wall of the passage 10 and force the stem far enough into the tire tube to unseat the corresponding valve. In this construction, the removal or spacing of the threads at 70 is of importance since the gasket would not otherwise be brought into tight engagement with the tire tube in all cases.

Various changes may obviously be made in the details of construction without departing from the spirit of my invention, for example, a very thin metal diaphragm may be used in lieu of or in addition to the rubber diaphragm 45 in some cases, but difficulty is incurred in sealing the pressure chamber where the thin metal diaphragm alone is used, and it is less sensitive to changes of pressure than is the rubber construction. I do not, therefore, wish to be limited otherwise than as indicated by the subjoined claims.

I claim:—

1. In combination a tube, a hollow casing detachably mounted on the tube, means for forming a pressure chamber in the casing in line with the axis of the tube, said last mentioned means including a flexible diaphragm in sealing engagement with the casing, said casing having a passage whereby the pressure chamber is brought into communication with the tube, a valve for relieving excess pressure in the tube, a valve stem for the valve, said stem being co-axial with the tube, resilient means for normally holding the valve closed, a movable member conforming to the interior of the casing, said member being adapted to receive the thrust put upon the diaphragm by air in the pressure chamber and being adapted to open the valve, resilient means for forcing the member in the direction opposite from that in which the diaphragm tends to move it, and means for adjusting the tension of the resilient means.

2. In combination a tube, a hollow casing detachably mounted on the tube, means for forming a pressure chamber in the casing in line with the axis of the tube, said last mentioned means including a flexible diaphragm in sealing engagement with the casing, said casing having a passage whereby the pressure chamber is brought into communication with the tube, a valve for relieving excess pressure in the tube, a valve stem for the valve, a valve tube whereby the valve and stem are inclosed, said stem extending into the casing and being spaced from the wall thereof, a movable member conforming to the interior of the casing, said member being arranged to receive the thrust put upon the diaphragm by air in the pressure chamber, and being adapted to move the valve to unseat the latter, and a spring surrounding the valve tube for forcing the member in a direction opposite from that in which the diaphragm tends to move it.

3. In combination, means for receiving air under pressure, a hollow casing detachably mounted on the air receiving means, a valve tube in the casing, the interior of said tube being in communication with the air receiving means, a perforated valve seat in the tube, a valve stem passing loosely through the seat, a valve on the stem, a cap covering the end of the tube and slidable longitudinally in respect thereto to exert pressure on the valve stem, said cap conforming to the interior of the casing, resilient means for moving the cap in one direction, means for forming a pressure chamber, means for connecting said pressure chamber with the pressure receiving means, said chamber forming means comprising a flexible diaphragm in sealed engagement with the casing, said diaphragm being adapted to exert pressure on the cap to open the valve.

4. In combination, means for receiving air under pressure, a hollow casing detachably mounted on the air receiving means, a valve tube in the casing, the interior of said tube being in communication with the air receiving means, a perforated valve seat in the tube, a valve stem passing loosely through the seat, a valve on the stem, a cap covering the end of the tube and slidable longitudinally in respect thereto to exert pressure on the valve stem, said cap conforming to the interior of the casing, resilient means for moving the cap in one direction, means for forming a pressure chamber in line with the tube and beyond the cap, means for connecting said pressure chamber with the pressure receiving means, said chamber forming means comprising a flexible diaphragm in sealed engagement with the casing, said diaphragm being adapted to exert pressure on the cap to open the valve.

5. In combination, means for receiving air under pressure, a hollow casing detachably mounted on the air receiving means, a valve tube in the casing, the interior of said tube being in communication with the air receiving means, a perforated valve seat in the tube, a valve stem passing loosely through the seat, a valve on the stem, a cap covering the end of the tube and slidable longitudinally in respect thereto to exert pressure on the valve stem, said cap conforming to the interior of the casing, resilient means for moving the cap in one direction, a nut threaded on the valve tube for determining the initial tension of the resilient means, means for forming a pressure chamber, means for connecting said pressure chamber with the pressure receiving means, said chamber forming means comprising a flexible diaphragm in sealed engagement with the casing, said diaphragm being adapted to exert pressure on the cap to open the valve.

6. In combination a tube, a hollow casing detachably mounted on the tube, means for forming a pressure chamber in the casing, said last mentioned means including a flexible diaphragm, said casing having a passage whereby the pressure chamber is brought into communication with the tube, a nut for securing the diaphragm in the casing, a spider secured within the pressure chamber for reinforcing the diaphragm, a valve for relieving excess pressure in the tube, a valve stem for the valve, a mvoable member conforming to the interior of the casing, said member being adapted to receive the thrust put upon the diaphragm by air in the pressure chamber and being adapted to open the valve, resilient means for forcing the member in the direction opposite from that in which the diaphragm tends to move it.

7. Pressure control mechanism comprising an externally threaded valve tube containing air under pressure, a casing surrounding the tube and spaced therefrom, a member conforming to the casing and movable in respect to the end of the tube, a spring tending to move the member in one direction on the tube, a nut on the tube for adjusting the tension of the spring, a relief valve in the tube, a spring tending to hold the valve closed, a valve stem extending longitudinally of the tube, means for forming a pressure chamber in the casing, said means including a flexible diaphragm arranged to transmit pressure to the movable member, the whole arrangement being such that the valve is opened to relieve the pressure when the latter exceeds a predetermined amount.

8. Pressure control mechanism comprising an externally threaded valve tube containing air under pressure, a casing surrounding the tube and spaced therefrom, a member conforming to the casing and movable in respect to the end of the tube, a spring tending to move the member in one direction on the tube, a nut on the tube for adjusting the tension of the spring, said casing having an opening through which access to the nut may be had, means for closing the opening, a relief valve in the tube, a spring tending to hold the valve closed, a valve stem extending longitudinally of the tube, means for forming a pressure chamber in the casing, said means including a flexible diaphragm arranged to transmit pressure to the movable member, the whole arrangement being such that the valve is opened to relieve the pressure when the latter exceeds a predetermined amount.

9. In combination, a tube, a casing detachably mounted on the tube, a diaphragm in said casing, a valve for relieving excess pressure in the tube, said diaphragm controlling said valve and both diaphragm and valve being movable toward said tube for relieving the excess pressure.

10. In combination, a tube, a casing detachably mounted on the tube, a diaphragm in said casing, a valve for relieving excess pressure in the tube, said diaphragm controlling said valve and both diaphragm and valve being movable toward said tube for relieving the excess pressure, there being a valved passage entering the casing at a point between the diaphragm and the tube through which the air in the tube may be renewed.

11. In combination, a tube, a casing detachably mounted on the tube, a diaphragm in said casing, a valve for relieving excess pressure in the tube, said diaphragm controlling said valve and both diaphragm and valve being movable toward said tube for relieving the excess pressure, a valve tube entering the casing from the side at a point between the diaphragm and the tube through which the air in the first mentioned tube may be renewed, and a valve in said valve tube.

12. Pressure controlling means including a chamber for confined fluid, a casing including a pressure chamber to which the confined fluid is also admitted, a valve for releasing fluid from the first mentioned chamber, a flexible diaphragm forming one wall of the pressure chamber, means whereby a deflection of the diaphragm in one direction causes the valve to release excess fluid, means tending to deflect the diaphragm in the opposite direction, a spider in the pressure chamber for reinforcing the diaphragm against the deflection last stated, and means for fixing the spider in place in the pressure chamber.

13. Pressure controlling means including a chamber for confined fluid, a casing including a pressure chamber to which the confined fluid is also admitted, a valve for releasing fluid from the first mentioned chamber, a flexible diaphragm forming one wall of the pressure chamber, means whereby a deflection of the diaphragm in one direction causes the valve to release excess fluid, means tending to deflect the diaphragm in the opposite direction, a spider in the pressure chamber for reinforcing the diaphragm against the deflection last stated, and an annular nut for fixing the spider in place in the pressure chamber.

14. Pressure controlling means including a chamber for confined fluid, a casing including a pressure chamber to which the confined fluid is also admitted, a valve for releasing fluid from the first mentioned chamber, a flexible diaphragm forming one wall of the pressure chamber, means whereby a deflection of the diaphragm in one direction causes the valve to release excess fluid, means tending to deflect the diaphragm in the opposite direction, a spider in the pressure chamber for reinforcing the diaphragm against the deflection last stated, an annular nut for fixing the spider in place in the pressure chamber, and means bearing on the nut on the side opposite the diaphragm for sealing the pressure chamber, said nut having an aperture through which fluid is admitted to the pressure chamber.

15. Pressure controlling means including a chamber for confined fluid, a casing including a pressure chamber to which the confined fluid is also admitted, a valve for releasing fluid from the first mentioned chamber, a flexible diaphragm forming one wall of the pressure chamber, means whereby a deflection of the diaphragm in one direction causes the valve to release excess fluid, means tending to deflect the diaphragm in the opposite direction, a spider in the pressure chamber for reinforcing the diaphragm against the deflection last stated, an annular nut for fixing the spider in place in the pressure chamber, and means bearing on the nut on the side opposite the diaphragm for sealing the pressure chamber, said nut having a plurality of apertures through which fluid is admitted to the pressure chamber, and being shaped to form with the casing a circumferential passage connecting the apertures.

16. In combination a tube, a hollow casing detachably mounted on the tube, a valve tube in said casing, a valve in the valve tube for relieving excess pressure in the first mentioned tube, a second valve tube entering the casing from the side, and a valve in the second valve tube whereby the air in the first mentioned tube may be renewed, said second valve tube passing transversely across the axis of the first mentioned valve tube and being perforated whereby the interiors of the two tubes are brought into communication with each other.

17. In combination with a tube, a hollow casing mounted on the tube, means for forming a pressure chamber in the casing in communication with the tube, a flexible diaphragm forming one wall of the chamber, a container for highly compressed air, means on one side of the diaphragm tending to deflect the latter in one direction, a valve tube secured to said casing in alinement with the diaphragm and valve mechanism in the tube whereby air from the container is admitted to the tube when the diaphragm is deflected in the direction stated, and valve mechanism on the opposite side of the diaphragm whereby air is allowed to escape from the tube whenever the pressure becomes excessive and deflects the diaphragm in the direction opposite to that first stated.

18. In combination with a tube, a hollow casing mounted on the tube, said casing having air passages, a container for compressed air, two valve mechanisms carried by the casing, means whereby one of the valve mechanisms is caused to allow air to escape whenever the pressure exceeds a predetermined amount and whereby the other valve mechanism is caused to allow the air to be renewed from a suitable source whenever the pressure falls below a predetermined amount, and a third valve mechanism carried by the casing whereby additional air may be supplied from another suitable source.

19. In combination with a tube, a hollow casing mounted on the tube, said casing having air passages, a container for compressed air, two valve mechanisms carried by the casing, means whereby one of the valve mechanisms is caused to allow air to escape whenever the pressure exceeds a predetermined amount and whereby the other valve mechanism is caused to allow the air to be renewed from a suitable source whenever the pressure falls below a predetermined amount, and a third valve mechanism carried by the casing whereby additional air may be supplied from another suitable source, said third valve mechanism extending transversely of the two first mentioned valve mechanisms.

20. In combination a tube, a hollow casing detachably mounted on the tube, means for forming a pressure chamber in the casing in line with the axis of the tube, said last mentioned means including a flexible diaphragm and means for securing the flexible diaphragm in sealing relation to the casing, said securing means stretching the diaphragm in all directions in the plane thereof, said casing having a passage whereby the pressure chamber is brought into communication with the tube, a valve for relieving excess pressure in the tube, a valve stem for the valve, said stem being co-axial with the tube, resilient means for normally holding the valve closed, a movable member conforming to the interior of the casing, said member being adapted to receive the thrust put upon the diaphragm by air in the pressure chamber and being adapted to open the valve, resilient means for forcing the member in the direction opposite from that in which the diaphragm tends to move it, and means for adjusting the tension of the resilient means.

EDWARD B. KEITH.